United States Patent [19]

Iizuka

[11] Patent Number: 5,299,321
[45] Date of Patent: Mar. 29, 1994

[54] PARALLEL PROCESSING DEVICE TO OPERATE WITH PARALLEL EXECUTE INSTRUCTIONS

[75] Inventor: Hiroshi Iizuka, Tokyo, Japan

[73] Assignee: Oki Electric Industry Co., Ltd., Tokyo, Japan

[21] Appl. No.: 97,325

[22] Filed: Jul. 26, 1993

Related U.S. Application Data

[63] Continuation of Ser. No. 808,909, Dec. 17, 1991, abandoned.

[30] Foreign Application Priority Data

Dec. 18, 1990 [JP] Japan ................................ 2-403229
Dec. 21, 1990 [JP] Japan ................................ 2-405037
Aug. 13, 1991 [JP] Japan ................................ 3-202770

[51] Int. Cl.$^5$ ............................................. G06F 9/38
[52] U.S. Cl. ................................ 395/375; 364/231.8; 364/DIG. 1
[58] Field of Search ............... 364/DIG. 1 MS File, 364/DIG. 2 MS File; 395/200, 375, 700, 800

[56] References Cited

U.S. PATENT DOCUMENTS

4,942,525 7/1990 Shintani et al. ................... 395/375

Primary Examiner—Robert B. Harrell
Attorney, Agent, or Firm—Edward D. Manzo; David K. Lucente

[57] ABSTRACT

A parallel processing device consists of plural processing pipelines arranged in parallel, decoders which decode processing instructions and outputs them to respective processing pipelines, and a general register in which the processing instruction to be outputted to each of decoders is written in one of its registering sections, or a multiple-port register. The processing instructions are written in the general register or the multiple-port register, wherein the respective registering sections storing the processing instructions are simultaneously specified either by a parallel instruction device, a one-dimensional expanded instruction register, or a two-dimensional expanded instruction register so that their contents are simultaneously outputted to make each of the processing pipelines perform simultaneously. Thus, the simultaneous concentration of a large amount of information can be avoided during the parallel processing operation, eliminating the need for a bus with a large bit number.

10 Claims, 9 Drawing Sheets

PARALLEL PROCESSING DEVICE TO OPERATE WITH PARALLEL EXECUTE INSTRUCTIONS

This is a continuation, of application Ser. No. 07/808,909, filed Dec. 17, 1991, now abandoned.

BACKGROUND OF THE INVENTION

1. Field of the Invention

The present invention relates to a parallel processing device for a computer or the like, which processes plural instructions in parallel in order to increase the speed of the information processing operation.

2. Description of the Prior Art

A number of methods have been developed in the past to increase the speed of information processing devices such as computers, and as a result, it has become possible to process an instruction, which might have required several clock cycles to be processed in the past, in approximately one clock cycle. In other words, the CPI (cycles per instruction) value, which might have been two to five in the past, has been approaching one. Meanwhile, a parallel processing device which simultaneously processes plural instructions has been considered so as to more highly increase the speed of the information processing device, that is, to reduce the CPI value to less than unity. The VLIW (Very Large Instruction Word) system ("Configuration Theory of Parallel Computers," Shinji Tomita, Shookoodoo Co., Ltd., Japan, pp. 131-142, November, 1986) is known as an example of this type of parallel processing device. The VLIW parallel computer according to "Configuration Theory of Parallel Computer" is outlined below, referring to FIG. 4.

Figure 4:
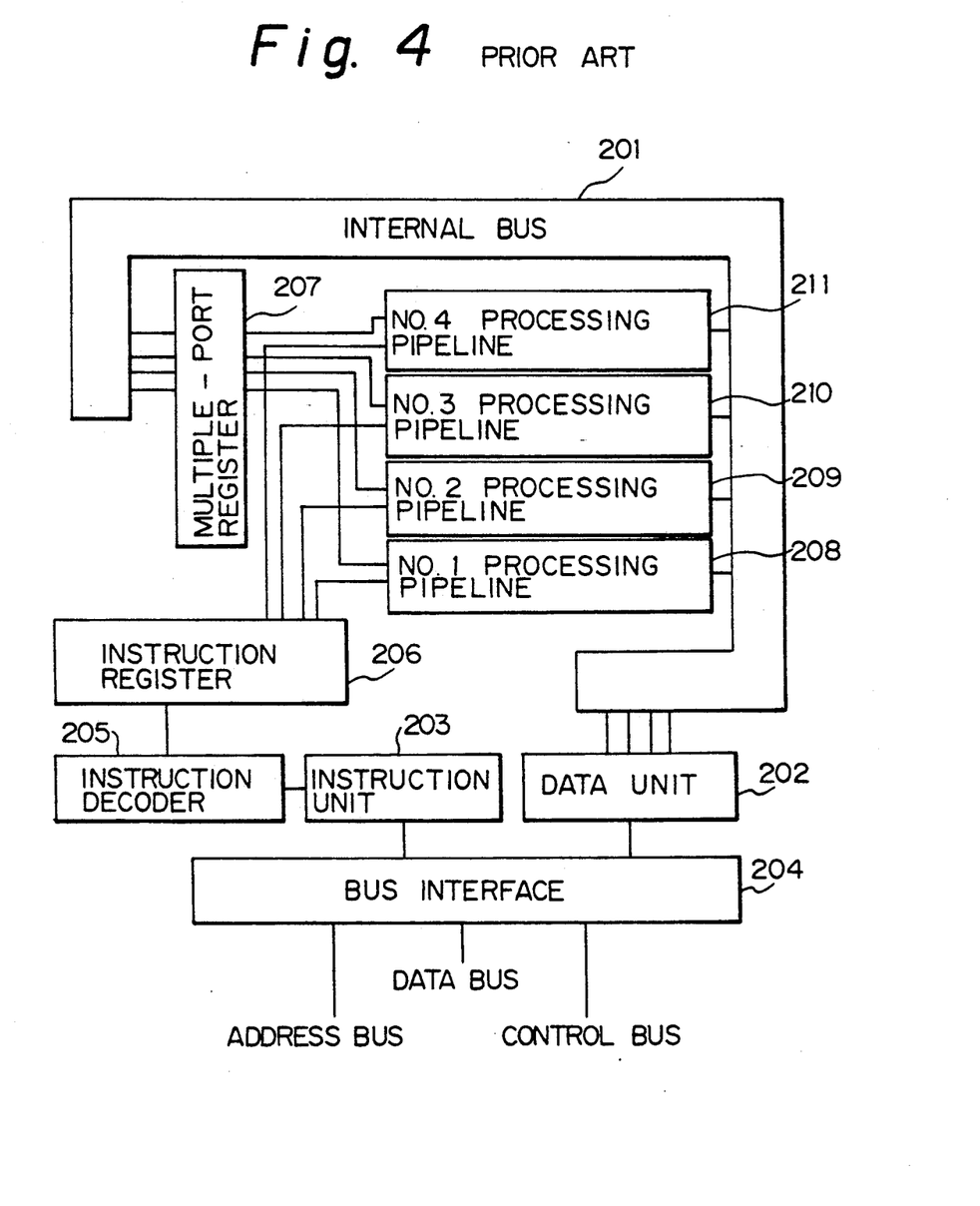
FIG. 4 is a block diagram schematically showing the prior parallel computer.

A basic instruction has a fixed length of 32 bits, and four basic instructions, forming one word, are stored in a space with a length of 128 bits. When the instructions are processed, the full length of one word is simultaneously read and four basic instructions are processed, in parallel and simultaneously through four processing pipelines, whereby the above CPI value becomes 0.25, idealistically. This prior device has four internal buses 201, which have a width of 32 bits. Data unit 202 is connected to internal bus 201 with four 32 bits buses, and this data unit 202 also contains a data cache. Instruction unit 203 also contains an instruction cache. Bus interface 204 is connected to data unit 202 with a 128 bit internal data bus, and also is connected to instruction unit 203 with a 128 bit instruction bus. Further, bus interface 204 is connected to external devices with a 32 bit address bus, a 128 bit data bus, and a 128 bit control bus. Numeral 205 is an instruction decoder, and numeral 206 is an instruction register. Instruction decoder 205 receives a 128 bits long instruction from instruction unit 203, decodes it and stores it in instruction register 206 as a micro instruction. Instruction register 206 retains a micro instruction equivalent to four instructions, and outputs this micro instruction to control No. 1 processing pipeline 208 to No. 4 processing pipeline 211. Numeral 207 is a multiple-port register, and this multiple-port register 207 is connected to internal bus 201 with four 32 bit buses to take in, through internal bus 201, the data to be processed, and outputs the data to respective processing pipelines 208 to 211 through four 32 bit buses. Each of the processing pipelines 208 to 211 spend several clock cycles to perform data processing operation, such as fixed-point arithmetic operation, logic operation, or floating-point arithmetic operation, according to the above mentioned micro instruction. Thus, in practice, the four processing pipelines 208 to 211 combined perform four processing operations every clock cycle. The output side of each of the processing pipelines 208 to 211 is connected to internal bus 201 through a 32 bit bus.

Next, the operation of the VLIW parallel computer having the above configuration is explained. Instruction unit 203 reads in a 128 bit long instruction from the external memory (not illustrated) through bus interface 204. Then, the instruction read that has been read in is decoded by instruction decoder 205 and written in instruction register 206 as a micro instruction. The micro instruction written in instruction register 206 is sent out to each of the appropriate processing pipelines 208 to 211 to control them. Each of the processing pipelines 208 to 211 reads in the data in multiple-port register 207 as is needed and writes the processed data in multiple-port register 207 through internal bus 201, and processing pipelines 208 to 211 again read in these data to perform plural processing operations. Also, processing pipelines 208 to 211 write the processed data in data unit 202 through internal bus 201, and data unit 202 in turn writes the data in multiple-port register 207 through internal bus 201, performing plural processing operations. Then, data unit 202 exchanges data with external devices through bus interface 204. Since the decoding of instructions, reading of micro instructions from instruction register 206, and processing operations in processing pipelines 208 to 211 are all performed by the processing pipelines, it becomes possible to execute four instructions per clock cycle. However, since four basic instructions are processed as one word in the above mentioned VLIW parallel computer, it becomes necessary for the data bus to have a width as high as 128 bits in contrast to the fact that the data bus width of an ordinary computer is 16 bits or 32 bits. Therefore, when this type of parallel processing device is packaged as a whole, there are problems such that the number of pins extending outward increases to make packaging complicated, as well as the fact that the number of peripheral circuits increases.

SUMMARY OF THE INVENTION

It is therefore an object of the present invention to provide a parallel processing device in which the number of pins is reduced by using ordinary 32 bit buses so that the peripheral circuits can be simplified, while maintaining the same high speed processing capacity.

The parallel processing device in accordance with the present invention is characterized in that it consists of plural processing pipelines provided in parallel for executing plural processing operations, either plural decoders which are provided corresponding to specific processing pipelines to decode processing instructions and output them to each of the specific processing pipelines; plural one-dimensional entries which correspond to one or more specific processing pipelines or shared by two or more processing pipelines; or plural two-dimensional entries with lines and columns, in any specific one of which the computer instructions are stored corresponding to respective processing pipelines, a general register with plural registering sections, in any one of which the processing instruction to be outputted to the decoder is written; a multiple-port expanded instruction register which selectively stores the computer instructions in appropriate entries and causes the plural instructions executed simultaneously by specifying simultaneously respective entries; or a two-dimensional expanded instruction register which makes plural computer instructions executed simultaneously, and a parallel execution instruction which simultaneously specifies respective registering sections of the above mentioned general register, multiple-port expanded instruction register, or two-dimensional expanded register, in which the processing instructions are written, and simultaneously outputs the contents to respective decoders to cause the respective pipelines perform simultaneously.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Below, each of the embodiments of the present invention is explained, referring to the drawings. In the drawings, common components are omitted for clarity of the explanation.

Figure 1:
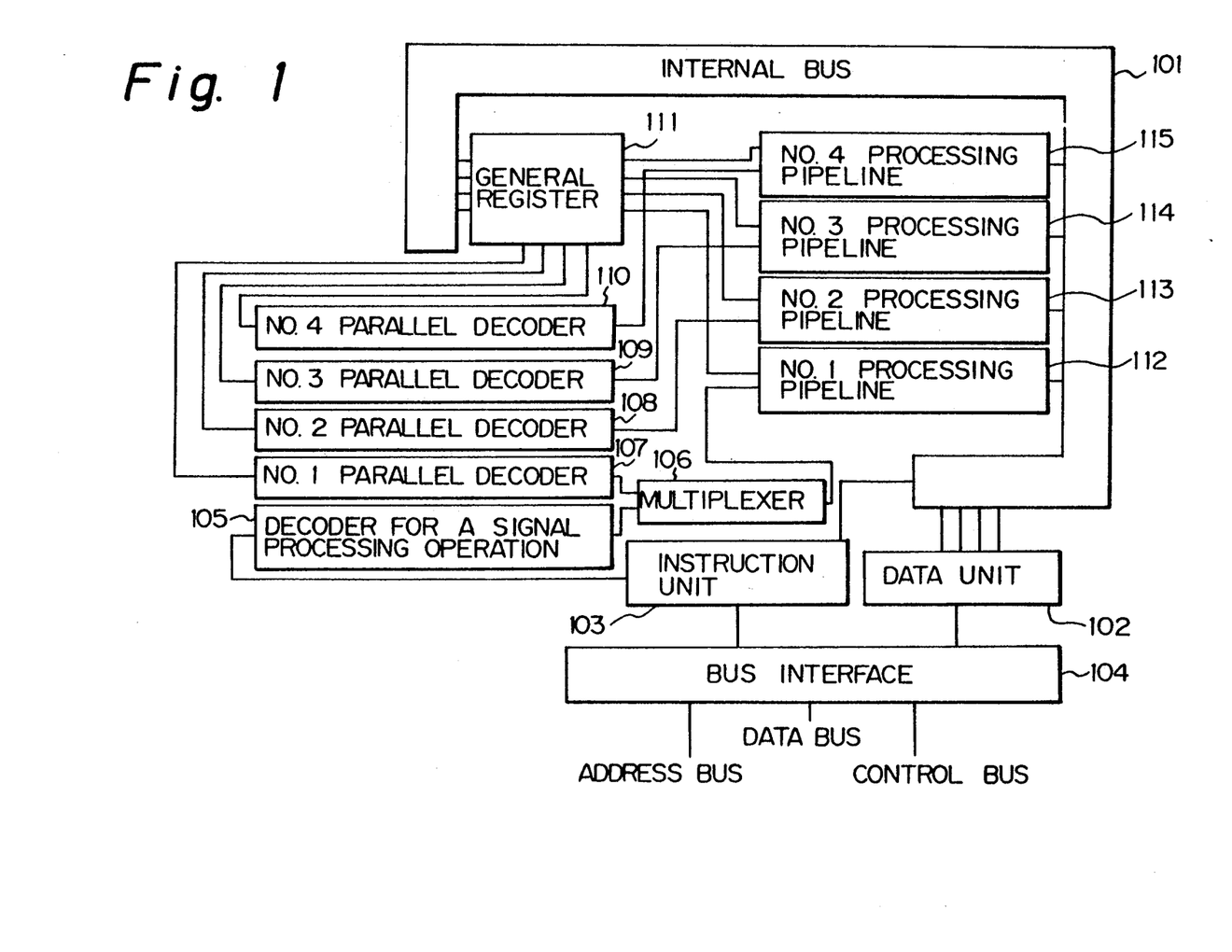
FIG. 1 is a block diagram schematically showing the first embodiment of the parallel processing device for a parallel computer in accordance with the present invention.

In FIG. 1, numeral 101 is an internal bus, 102 a data unit containing a data cache, 103 an instruction unit containing an instruction cache, 104 a bus interface, and 112 to 115 are No. 1 to No. 4 processing pipelines.

Figure 2:
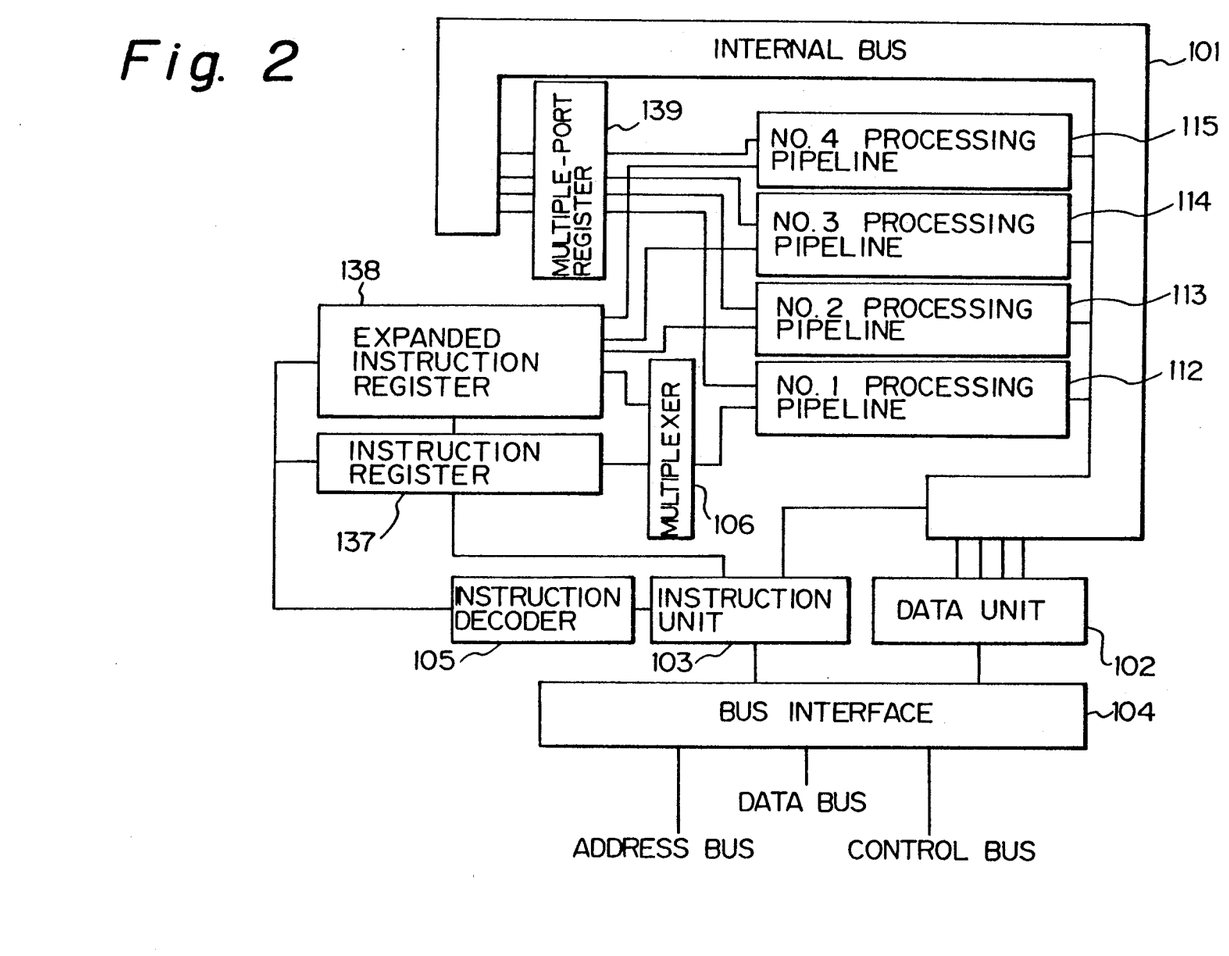
FIG. 2 is a block diagram schematically showing the second embodiment of the parallel processing device for a parallel computer in accordance with the present invention.
Figure 3:
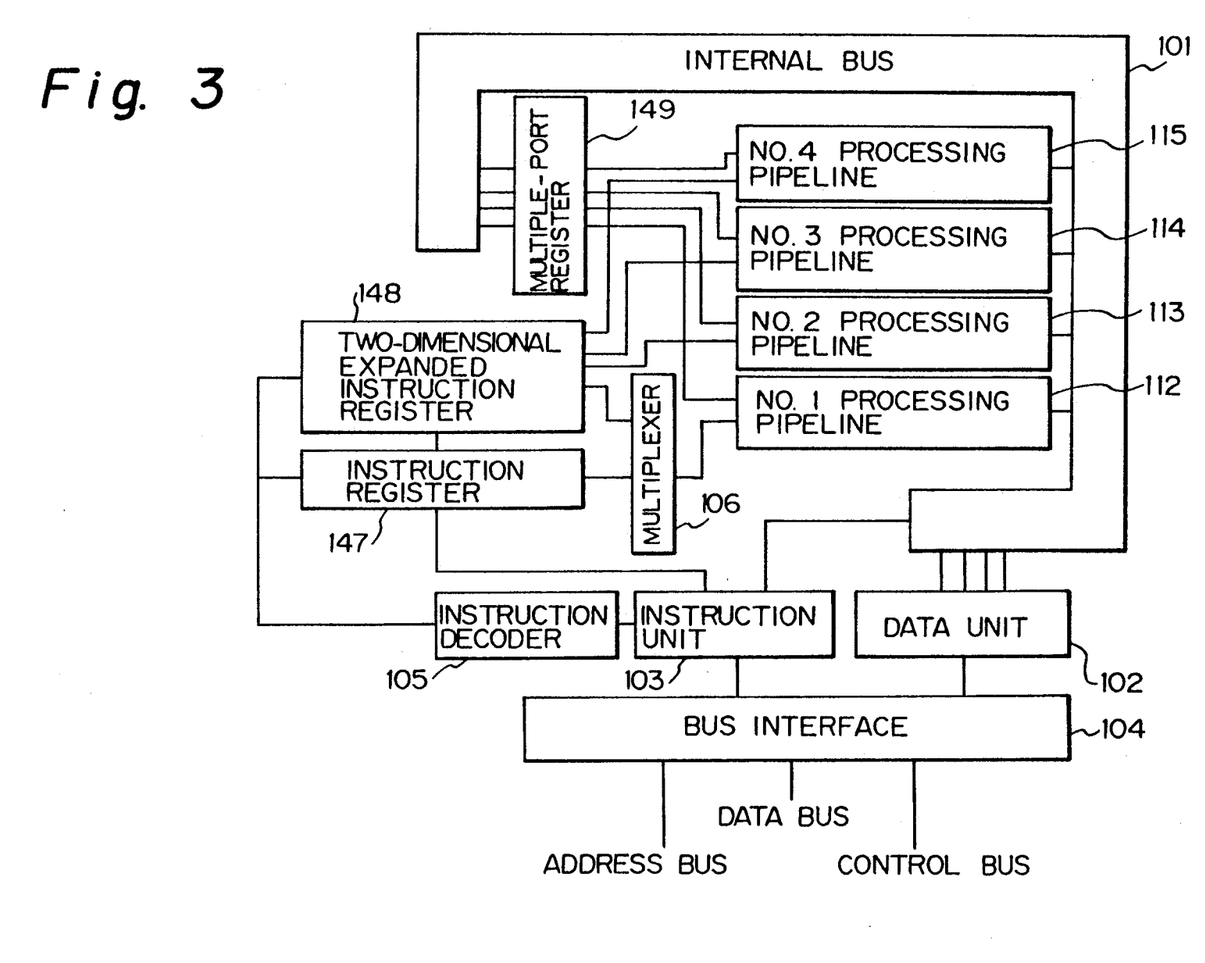
FIG. 3 is a block diagram schematically showing the third embodiment of the parallel processing device for a parallel computer in accordance with the present invention.

In FIGS. 1, 2 and 3, internal bus 101 and data unit 102 are connected with a 32 bit internal data bus. Data unit 102 and bus interface 104 are connected with a 32 bit internal data bus. Instruction unit 103 and bus interface 104 are connected with a 32 bit instruction bus. Bus interface 104 is connected to an address bus, a data bus and a control bus, each of which is a 32 bit bus. Instruction unit 103 is connected to internal bus 101.

In FIG. 1, numeral 105 indicates a decoder for a single processing operation, which decodes an instruction received from instruction unit 103, and outputs it as a micro instruction. Numeral 106 is a multiplexer, and 107 indicates No. 1 parallel decoder for a parallel processing operation, which decodes a processing instruction from the general register 111, which will be explained later, and outputs it to No. 1 processing pipeline 112 as a micro instruction through multiplexer 106. Numeral 108 indicates No. 2 parallel decoder, which decodes a processing instruction from general register 111 and outputs it to No. 2 processing pipeline 113 as a micro instruction. Numeral 109 indicates No. 3 parallel decoder, and 110 indicates No. 4 parallel decoder, both of which decode processing instructions from general register 111 and output them to No. 3 and No. 4 processing pipelines 114 and 115 as a micro instruction, respectively, in the same manner as No. 2 parallel decoder 108.

In FIGS. 2 and 3, numeral 137 and 147 indicate instruction registers, which retain a single micro instruction decoded by instruction decoder 105. Then, these instruction registers 137 and 147 send out address information (source operand) to instruction unit 103, send out operation information (operation code) to expanded instruction register 138 and two-dimensional expanded instruction register 148, respectively, and in addition, send out processing information (micro instruction) for No. 1 processing pipeline 112 to multiplexer 106. Here, a micro instruction means an ordinary processing instruction (computer instruction), or decode instruction 121, or parallel execute instruction 131 and the like, which will be explained later.

In the second embodiment in FIG. 2, numeral 138 indicates an expanded instruction register with multiple-ports, which has plural entries (seven entries in FIG. 5) and retains micro instructions. This expanded instruction register 138 is configured to have multiple-ports whereby it is made possible to simultaneously perform both a read-in operation with a single specified entry and a read-out operation with four specified entries, and the four entries to be read are specified by instruction register 137. Incidentally, the four entries retaining a micro instruction may be specified corresponding to the respective processing pipelines 112 to 115, or the empty entries may be selected for storage as they fit without being specified. Multiplexer 106 selectively outputs a micro instruction sent out from the read-out port of instruction register 137 or expanded instruction register 138 to No. 1 processing pipeline 112. Then, expanded instruction register 138 is connected to instruction register 137, multiplexer 106, and each of the processing pipelines 112 to 115, respectively, and micro instructions stored in the respective entries of expanded instruction register 138 are outputted, by parallel execute instruction 131 inputting to instruction register 137, to multiplexer 106 (No. 1 processing pipeline 112) and No. 2 to No. 4 processing pipelines 113 to 115, respectively, to control the respective processing pipelines 112 to 115.

Figure 6:
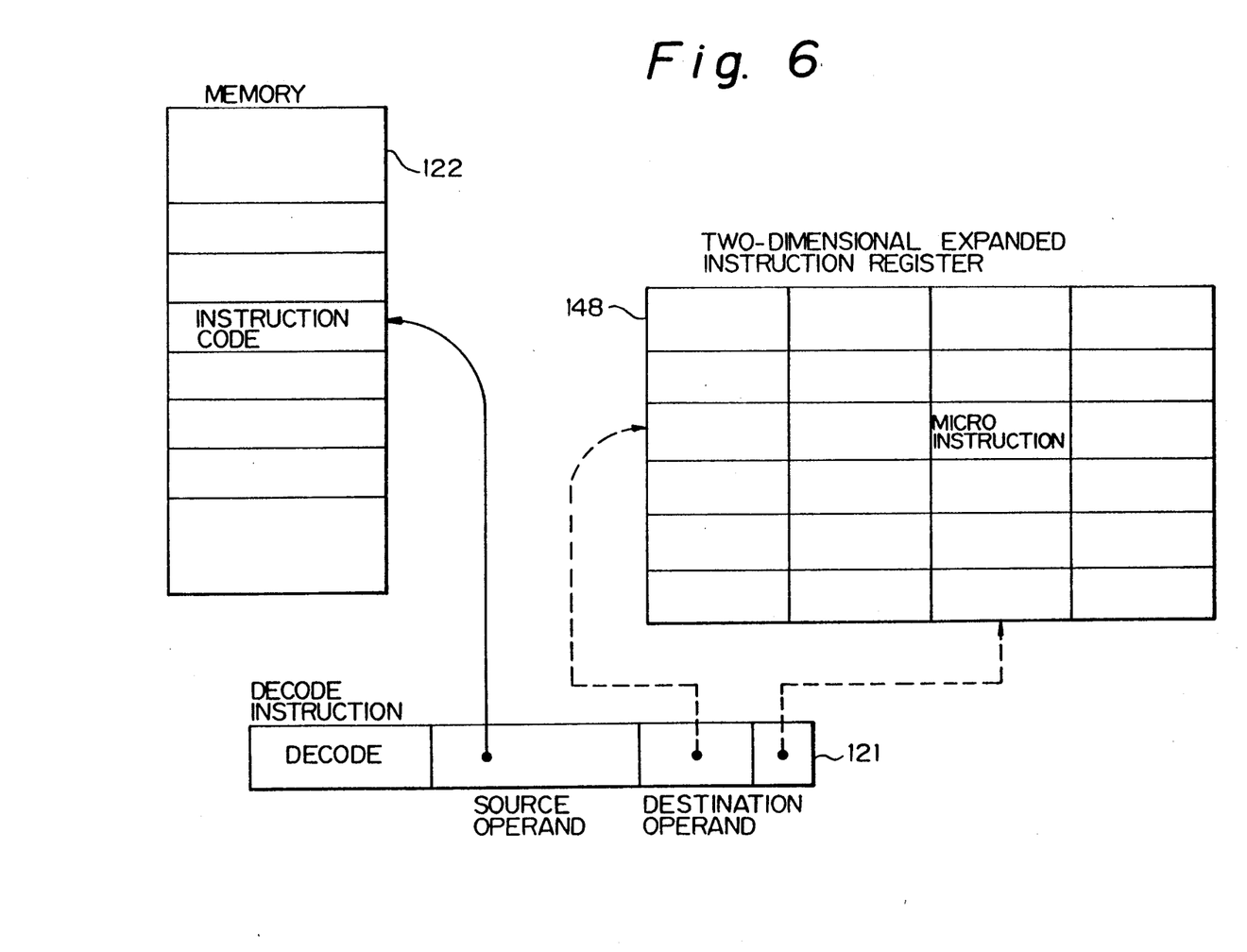
FIG. 6 is an explanatory diagram showing the decode instructions for the third embodiment.
Figure 9:
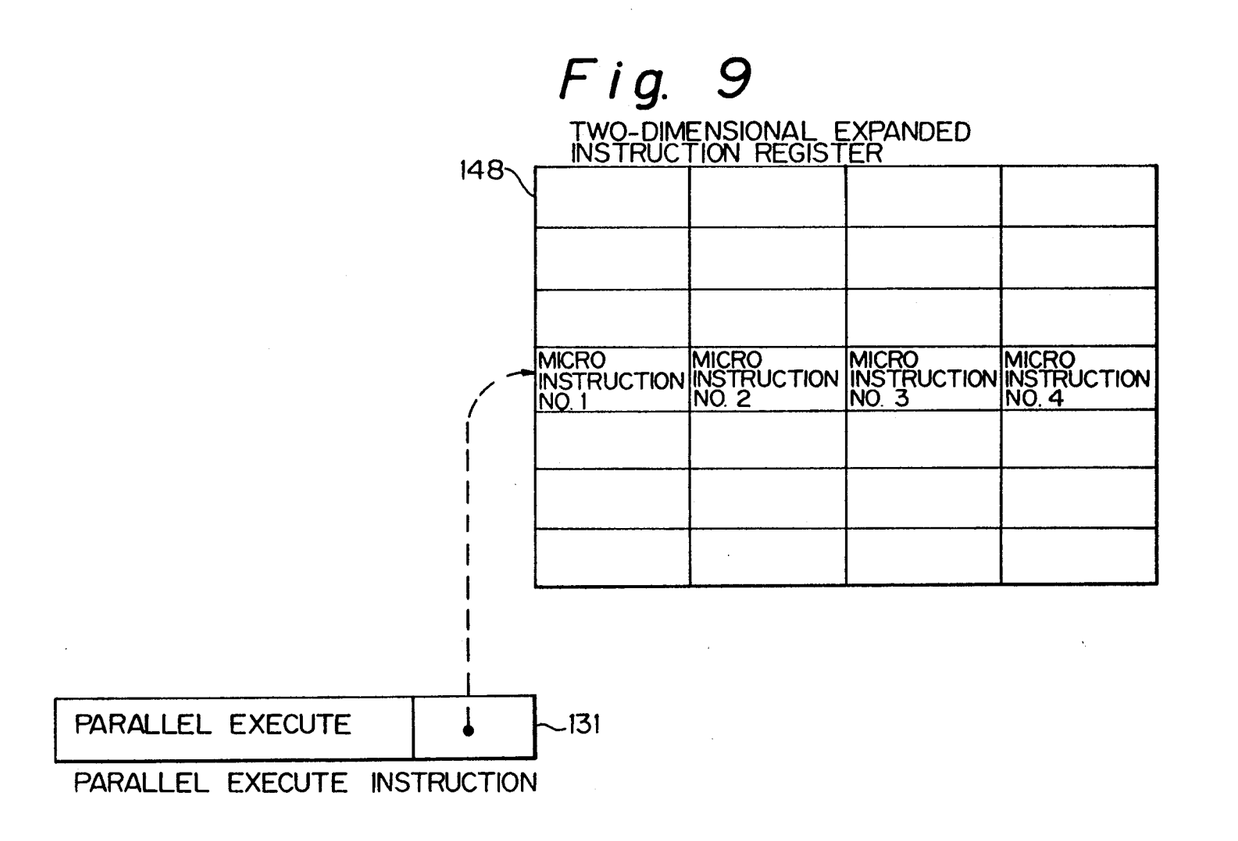
FIG. 9 is an explanatory diagram showing the parallel execute instructions for the third embodiment.

In the third embodiment in FIG. 3, numeral 148 indicates a two-dimensional expanded instruction register, which has two-dimensional entries and retains plural micro instructions (refer to FIGS. 6 and 9). The horizontal dimension of this two-dimensional expanded instruction register 148 is called "line" and the vertical dimension "column," and as an example, the number of lines is set to be 256 and the number of columns is selected to match the number of processing pipelines. Further, the columns in FIG. 6 correspond to No. 1 to No. 4 processing pipelines 112 to 115 in sequential order from the right. This two-dimensional expanded instruction register 148 has two ports, which makes it possible to simultaneously perform both the operations of specifying a single entry and writing in it, and specifying a single line and reading it, and the line to be read is specified through instruction register 147. Incidentally, the micro instructions may be stored in all of four columns in a single line, corresponding to respective processing pipelines 112 to 115. Further, two-dimensional expanded instruction register 148 is connected to instruction register 147, multiplexer 106, and respective processing pipelines 112 to 115, and the micro instructions stored in the respective lines of two-dimensional expanded instruction register 148 are outputted to multiplexer 106 (No. 1 processing pipeline 112) and the respective processing pipelines No. 2 to No. 4 by parallel execute instruction 131 inputting to instruction register 147, to control the respective processing pipelines 112 to 115. Multiplexer 106 selectively sends out a micro instruction outputted from the read-out port of instruction register 147 or two-dimensional expanded instruction register 148 to No. 1 processing pipeline 112. Instruction decoder 105 receives each instruction from instruction unit 103 and after decoding it into a micro instruction, stores it in instruction register 147, or stores it in one of the entries of two-dimensional instruction register 148 according to each address information (destination operand).

In the first embodiment in FIG. 1, general register 111 consists of plural registering sections. Specifically speaking, this general register 111 has, for example, 64 registering sections, each one of which is 32 bits long and capable of storing a single processing instruction. Further, general register 111 has multiple-ports, is connected to internal bus 101 through four 32 bit two way buses to input or output data, and in addition, outputs data to the respective processing pipelines 112 to 115 through 32 bit buses. In each registering section of general register 111, processing instructions for controlling respective processing pipelines 112 to 115 are written based on a load instruction.

Figure 5:
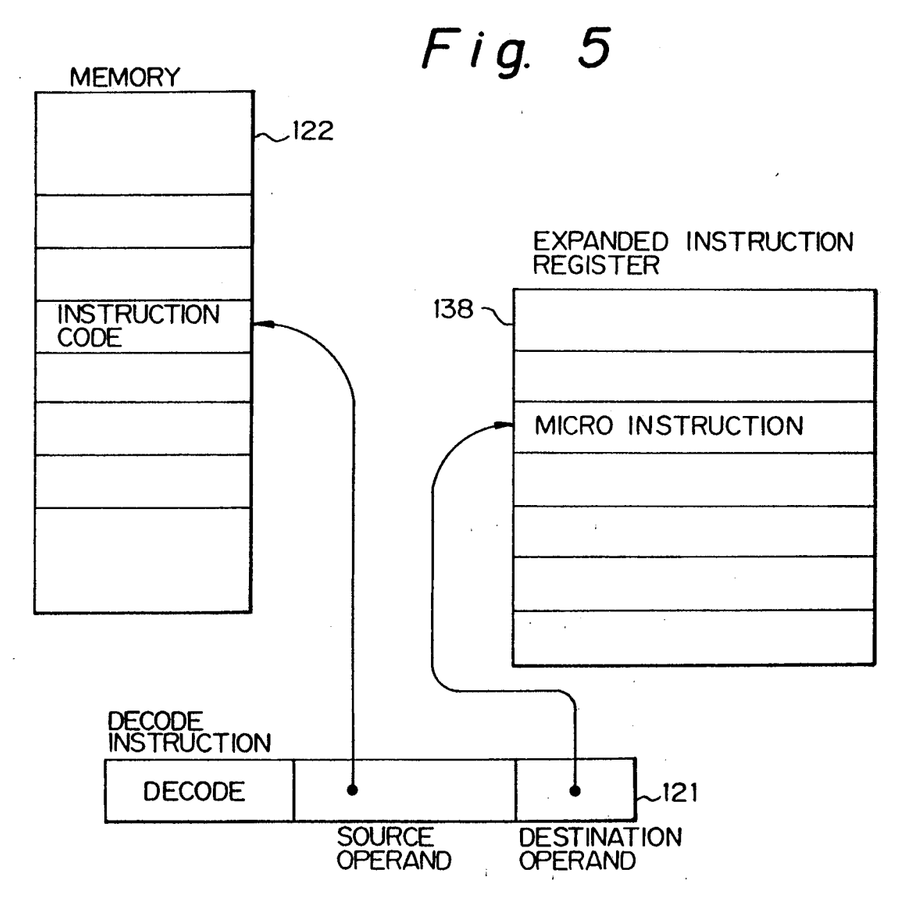
FIG. 5 is an explanatory diagram showing the decode instructions for the second embodiment.

In FIG. 2, instruction decoder 105 receives an instruction from instruction unit 103 and after decoding it into a micro instruction, stores it in instruction register 137, or stores it in one of the entries of expanded instruction register 138 according to each address information (destination operand). Decode instruction 121 is configured as is shown in FIG. 5. In other words, it consists of a operation code meaning "decode," source operand, and destination operand, and as examples of the lengths of these operand fields, the operation code has eight bits, the source operand 16 bits, and the destination operand has eight bits, for example. The source operand specifies the head address, that is the effective address, of the specific instruction (computer instruction and the like) in external memory 122, in the commonly known addressing mode, such as the direct or indexing addressing mode. On the other hand, the destination operand specifies one of the entries in expanded instruction register 138, and this decode instruction 121 interprets the computer instruction, which is the contents of the memory specified by the effective address, as an instruction, and stores it in one of the entries of expanded instruction register 138 which is specified by the destination operand after decoding this computer instruction.

In the third embodiment in FIG. 3, decode instruction 121 is configured as is shown in FIG. 6. In other words, it consists of an operation code meaning "decode", a source operand, and a destination operand, and as for the bit length of these, the operation code consists of eight bits, the source operand 14 bits, and the destination operand consists of ten bits. The source operand specifies the head address, that is the effective address, of a specific instruction (computer instruction and the like) in external memory 122, in the commonly known addressing mode, such as direct or indexing addressing mode. On the other hand, the destination operand filed is divided into a line field and a column field, which are of eight bits and two bits, respectively, and specifies one of the entries of two-dimensional expanded instruction register 148 by means of selecting a specific line and a specific column. Then, this decode instruction 121 interprets a computer instruction, which is the contents in the memory specified by the effective address, as an instruction, and stores it in one of the entries of two-dimensional expanded instruction register 148 specified by the destination operand after decoding this computer instruction.

Figure 7:
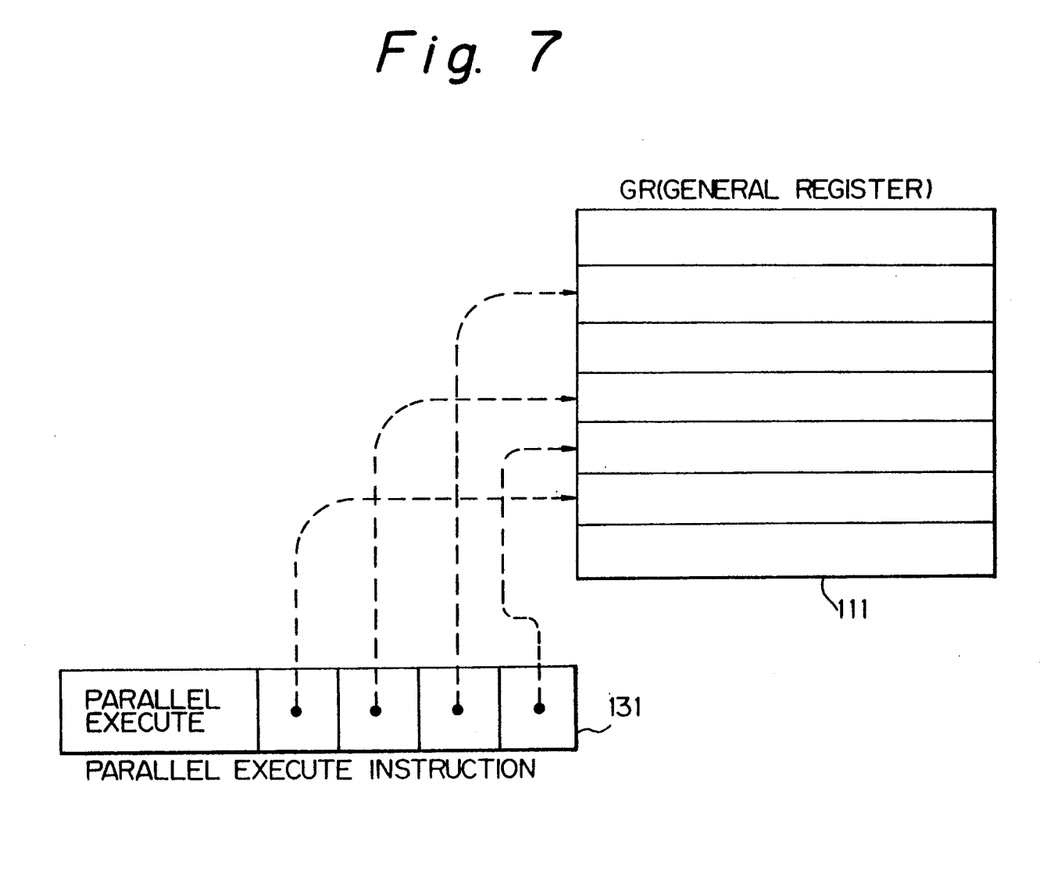
FIG. 7 is an explanatory diagram showing the parallel execute instructions for the first embodiment.

In this first embodiment in FIG. 1, the parallel execute instruction, which is an instruction for parallel operations, is configured as is shown in FIG. 7. In other words, it consists of an operation code meaning "parallel execute" and four fields, each of which specifies a specific registering section of general register 111. As for examples of the bit lengths, the operation code has eight bits, and each field has six bits. Now then, parallel execute instruction 131 simultaneously specifies all of the specific registering sections of general register 111 to make all of the processing pipelines 112 to 115 perform simultaneously, through the respective decoders 107 to 110.

Figure 8:
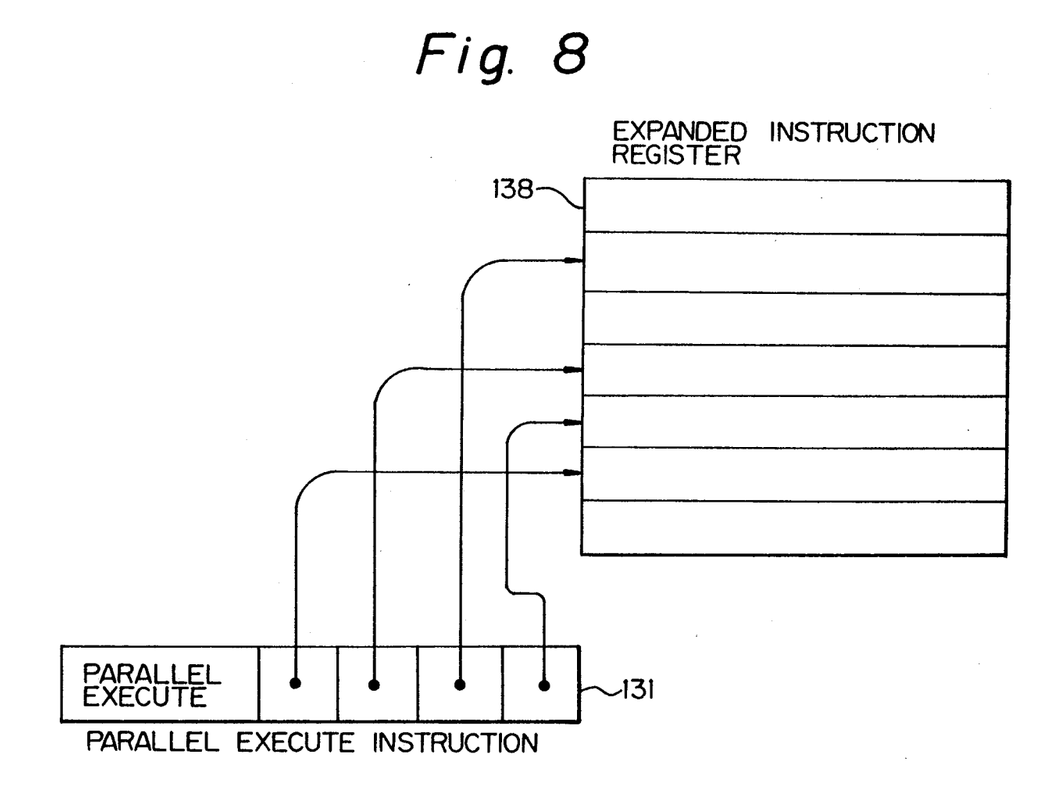
FIG. 8 is an explanatory diagram showing the parallel execute instructions for the second embodiment.

In the second embodiment in FIG. 2, parallel execute instruction 131 is configured as is shown in FIG. 8. In other words, it is structured to include an operation code meaning "parallel execute" and four fields specifying four entries of expanded instruction register 138. As for examples of the bit lengths, the operation code has eight bits and each field has six bits. Now then, parallel execute instruction 131 simultaneously specifies all of respective entries in expanded instruction register 138 to make the respective pipelines 112 to 115 perform simultaneously.

In the third embodiment in FIG. 3, parallel execute instruction 131 consists, as is shown in FIG. 9, of an operation code meaning "parallel execute" and a field specifying a line in two-dimensional expanded instruction register 148. As for the bit lengths, the operation code has 24 bits and the field specifying the line has eight bits. Now then, parallel execute instruction 131 specifies one line in two-dimensional expanded instruction register 148 to make all of the processing pipelines 112 to 115 perform simultaneously.

Next, the processing operation of a parallel computer having the above mentioned configuration is explained referring to the first embodiment in FIG. 1. First, a single ordinary processing operation is performed in the following manner. Instruction unit 103 reads in a processing instruction from an external memory through bus interface 104. Next, the instruction read in is written in decoder 105, wherein it is decoded into a micro instruction to control No. 1 processing pipeline 112 through multiplexer 106. This processing pipeline 112 reads the data in general register 111 as is needed, and also writes the processed data in general register 111 through internal bus 101. Then, processing pipeline 112 writes the processed data in data unit 102 through internal bus 101, and data unit 102 writes the same data in general register 111 through internal bus 101. Also, data unit 102 exchanges data with external devices through bus interface 104.

Next, in FIG. 2, the processing operation of the second embodiment of the parallel computer having the above mentioned configuration is explained. First, a single ordinary processing operation is performed in the following manner. Instruction unit 103 reads in an instruction from external memory 122 through bus interface 104. Next, the instruction read in is decoded by instruction decoder 105 and is written in instruction register 137 as a micro instruction. The micro instruction written in instruction register 137 controls No. 1 processing pipeline 112 through multiplexer 106. This processing pipeline 112 reads the data in multiple-port register 139 as is needed, and also, writes the processed data in data unit 102 through internal bus 101. Data unit 102 writes this data in multiple-port register 139 through internal bus 101. Also, data unit 102 exchanges data with external devices through bus interface 104.

Next, in FIG. 3, the processing operation of the third embodiment of the parallel computer having the above mentioned configuration is explained. First, a single ordinary processing operation is performed in the following manner. Instruction unit 103 reads in an instruction from external memory 122 through bus interface 104. Then, the instruction that has been read in is decoded by instruction decoder 105 and written in instruction register 147 as a micro instruction. The micro instruction written in instruction register 147 controls No. 1 processing pipeline 112 through multiplexer 106. This processing pipeline 112 reads in the data in multiple-port register 149 as is needed, and also, writes the processed data in multiple-port register 149 through internal bus 101. Then, processing pipeline 112 writes the processed data in data unit 102 through internal bus 101, and data unit 102 writes this data in multiple-port register 149 through internal bus 101. Also, data unit 102 exchanges data with external devices through bus interface 104.

The parallel processing is performed in the following manner. Decode instruction 121 is stored in instruction register 147, and instruction unit 103 reads out, as an instruction, the contents of external memory 122 corresponding to the address information of the source operand. Then, instruction decoder 105 decodes this memory contents, specifies thereby a line and a column according to the information of the destination operand of decode instruction 121 in instruction register 147, specifying thereby one of the entries in two-dimensional expanded instruction register 148, and stores the decoded result (micro instruction) in the specified entry. This operation is repeated to store the micro instruction in each entry corresponding to each of the processing pipelines 112 to 115. This processor is performed before entering a loop processing operation. Then, the instructions to be processed in parallel are written in data sections and the like at the compiling stage of a program. Incidentally, most computer instructions are contained in loops and are repeatedly performed in many cases. Generally speaking, since 95% of the execution time is spent on 5% of the entire source codes, the time spent for storing the micro instruction in each of the entries of two-dimensional expanded instruction register 148 is such a short time that it hardly amounts to anything compared to the processing time involving loops.

Now then, as parallel execute instruction 131 is stored in instruction register 147, each micro instruction specified in two-dimensional expanded instruction register 148 by each field of this instruction 131 is outputted to each of the processing pipelines 112 to 115. At this time, the input side of multiplexer 106 has been switched to the side of two-dimensional expanded instruction register 148, and each of the processing pipelines 112 to 115 performs a pipeline processing operations according to each of the corresponding micro instructions. Also, since decoding of parallel execute instruction 131, reading out the micro instruction from two-dimensional expanded instruction register 148, and a processing operation in each of processing pipelines 112 to 115 are all performed by pipelining, an equivalent of four instructions per clock cycle is continued to be executed as long as parallel execute instruction 131 is repeated due to a loop processing operation. Thus, the execution of one parallel executed instruction becomes equivalent to the execution of four ordinary instructions, from the point of execution speed. Incidentally, it is preferable to limit the number of ordinary instruction in loops to a minimum and place as many parallel execute instructions 131 as possible.

In the first embodiment in FIG. 1, the parallel processing is performed in the following manner. First, plural processing instructions to be executed in parallel are sequentially stored in the specific registering sections of general register 111 by using load instructions before entering the loop. These processing instructions have a fixed length of 32 bits and are written in data sections and the like at the compiling stage of a program. Incidentally, the processing instructions are mostly contained in loops and are repeatedly performed in many cases. Generally speaking, since 95% of the execution time is spent on 5% of the entire source codes, the time spent for storing the processing instructions in the respective registering sections of general register 111 is such a short time that it hardly amounts to anything compared to the time spent on the loop processing operation.

As parallel execute instruction 131 is written in decoder 105, the respective processing instructions specified in general register 111 by the respective fields of this instruction 131 are outputted to No. 1 parallel decoder 107 to No. 4 parallel decoder 110. Each of decoders 107 to 110 outputs the received processing instruction to the corresponding processing pipelines 112 to 115 after decoding it into the micro instruction. At this time, the input side of multiplexer 106 has been switched to the No. 1 parallel decoder 107 side, and each of the processing pipelines 112 to 115 performs the pipeline processing operation according to the corresponding micro instruction. Then, since decoding of parallel execute instruction 131, reading out the processing instructions from general register 111, and decoding the processing instructions by No. 1 parallel decoder 107 to No. 4 parallel decoder 110 are all performed by the processing pipelines, an equivalent of four instructions per clock cycle is continued to be executed as long as parallel execute instruction 131 is repeated in the loop processing operation. Thus, the execution of one parallel execute instruction 131 becomes equivalent to the execution of four ordinary instructions from the point of execution speed. Incidentally, it is preferred to minimize the number of ordinary instructions and place as many parallel execute instructions 131 as possible in the loops.

If the parallel processing operation is performed in the second embodiment in FIG. 2, it is carried out as follows. Decode instruction 121 is stored in instruction register 137, and instruction unit 103 reads out the contents of external memory 122 corresponding to the address information of the source operand as an instruction. Then, instruction decoder 105 decodes this memory contents and stores the results of decoding (micro instruction) in one of the entries of expanded instruction register 138 according to the information of destination operand of decode instruction 121 in instruction register 137. This operation is repeated so as to store each of micro instructions in the proper entry corresponding to each of the processing pipelines 112 to 115. This processing operation is performed before entering the loop processing operation. Also, the instructions to be executed in parallel are written in data sections and the like at the compiling stage of a program. Incidentally, most of micro instructions (computer instructions) are contained in loops and are repeatedly executed in many cases. Generally speaking, since 95% of the execution time is spent on 5% of the entire source codes, the time spent for storing the micro instructions in the respective entries of expanded instruction register 138 is such a short time that it hardly amounts to anything compared to the time spent on the loop processing operation.

As parallel execute instruction 131 is stored in instruction register 137, respective micro instructions specified in expanded instruction register 138 by respective fields of this instruction 131 are outputted to the respective processing pipelines 112 to 115. At this time, the input side of multiplexer 106 has been switched to the expanded instruction register 138 side, and each of the processing pipelines 112 to 115 performs a pipeline processing operation according to the corresponding micro instruction. Also, since decoding of parallel execute instruction 131, reading of micro instructions from expanded instruction register 138, and processing operations in processing pipelines 112 to 115 are all performed by the processing pipelines, an equivalent of four instructions per clock cycle is continued to be executed as long as parallel execute instruction 131 is repeated due to the loop processing operation. Thus the execution of one parallel execute instruction becomes equivalent to the execution of four ordinary instructions from the point of execution speed. Incidentally, it is preferred to minimize the number of ordinary instructions and place as many parallel execute instructions 131 as possible in loops.

In the first embodiment in FIG. 1, an explanation is given in a case in which four ordinary instructions are executed in parallel by one parallel execute instruction 131, but it is possible to perform the same operation and obtain the same effects as the above mentioned case even if two, three, or more than five ordinary instructions are executed in parallel by one parallel execute instruction. Also, a different operation code may be assigned to each of the respective fields of the parallel execute instruction which executes two, three, or more than five ordinary instructions, to make each processing pipeline perform a different processing operation. Needless to say, in the case of the parallel execute instruction which handles the above mentioned more than five ordinary instructions, more than five decoders and processing pipelines may be provided to accommodate these instructions.

Since the parallel computer such as the second embodiment in FIG. 2 has a configuration wherein expanded instruction register 138 and multiplexer 106 are provided in the prior parallel computer, it can be easily expanded. In this example, an explanation was given in a case in which four ordinary instructions are executed in parallel by one parallel execute instruction 131, but the same operation can be performed and the same effects can be obtained as the above mentioned case even if two, three or more than five ordinary instructions are executed in parallel by one parallel execute instruction. Also, a different operation code may be assigned to each field of the parallel execute instruction which executes two, three, four, or more than five ordinary instructions in parallel, to make each processing pipeline perform a different processing. Needless to say, in the case of the parallel execute instruction which handles more than five instructions, more than five processing pipelines may be provided to accommodate these instructions. Further, the instruction to be decoded may have a fixed length of, for example, 32 bits, or a variable length. In other words, the parallel computer based on the present invention may be either a RISC (reduced instruction set computer) or a CISC (complex instruction set computer).

Since the parallel computer such as the third embodiment in FIG. 3 has a configuration wherein the prior parallel computer is provided with two-dimensional expanded instruction register 148 and multiplexer 106, it can be easily expanded. Incidentally, in this embodiment, an explanation was given in a case in which four ordinary instructions are executed by one parallel execute instruction 131, but even when two, three, or more than five ordinary instructions are executed by one parallel execute instruction, the same operation can be performed and the same effects can be obtained as the above mentioned case. Needless to say, in the case of the parallel execute instruction which handles more than five instruction in parallel, more than five processing pipelines may be provided to accommodate the situation. Furthermore, the instruction to be decoded may have a fixed length of, for example, 32 bits, or a variable length. In other words, the parallel computer based on the present invention may be of either the RISC (reduced instruction set computer) type or the CISC (complex instruction set computer) type.

The prior VLIW parallel computer requires a data bus having a width of 128 bits in order to execute four basic instructions as a single word per clock cycle, but according to the configurations explained above, a parallel computer such as each of the above embodiments requires an instruction bus and a data bus having a width of only 32 bits in order to perform equivalently while maintaining the same high speed information processing capacity as the prior parallel computer, and as a result, the overall size can be reduced to be more compact and the number of peripheral circuits can be reduced.

According to the present invention explained above in detail, the parallel processing device is provided with plural processing pipelines which are provided in parallel to execute plural processing operations in parallel; decoders which decode processing instructions and output them to respective processing pipelines, plural entries which correspond to one or more of the processing pipelines or shared by two or more of the processing pipelines, or two-dimensional entries which correspond to two or more of the processing pipelines; a general register with plural registering sections, in any one of which the processing instruction to be outputted to each of the decoders is written, a multiple-port expanded instruction register which selectively stores the computer instructions in its entries and causes the instructions in the entries to be executed simultaneously, or two-dimensional expanded instruction register which sequentially stores the computer instructions in its two dimensional entries specified by the line and column and causes plural computer instructions to be simultaneously executed by specifying the specific line. Thus, it becomes possible to write sequentially the processing instructions in the respective registering sections of the general register and to specify simultaneously the respective registering sections, in which the processing instructions have been written, by means of a parallel processing instruction, so that the processing instructions are simultaneously outputted to respective decoders to cause respective processing pipelines to perform simultaneously; to store sequentially the computer instructions in the respective entries by means of specifying the appropriate entries and to specify simultaneously the respective entries, so that a parallel processing operation is performed by means of executing simultaneously the computer instructions in the respective entries; or to store sequentially the computer instructions in the appropriate columns of the specific line and to specify this specific line, so that the computer instructions are simultaneously executed. Thus, the problem of simultaneous concentration of a large amount of information can be solved to eliminate need for the use of a bus with a large bit number. Accordingly, the number of bits in a bus can be smaller compared to the prior one and the overall size of the unit can be smaller and more compact, and also, the number of peripheral circuits can be reduced.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A parallel processing device for performing processing operations in response to processing instructions defined by a parallel execute instruction to be executed in parallel, comprising:
    an input circuit to receive the processing instructions and data to be processed;
    a first decoder connected to said input circuit for decoding the processing instructions and producing a micro instruction for controlling processing corresponding to the decoded processing instructions;
    storage circuitry to store at least either one of data to be processed and one of the processing instructions defined by the parallel execute instruction;
    an internal bus connected to said input circuit and said storage circuitry for transferring bits of the data to be processed and the processing instructions in parallel from said input circuit to said storage circuitry;
    a plurality of second decoders connected to said storage circuitry, each second decoder decoding a respective instruction received from said storage circuitry, and producing a micro instruction for controlling processing corresponding to the instruction decoded therein;
    a plurality of parallel pipeline processors, each connected to said storage circuitry and each except one to a respective one of said second decoders, said parallel pipeline processors being connected to said internal bus, whereby each parallel processor except one performs processing operations in response to the micro instruction received corresponding second decoder; and
    a multiplexer interconnected to said first decoder, to at least one of said second decoders that is not connected to any of said parallel pipeline processors, and to said parallel pipeline processor that is not connected to said second decoder, said multiplexer selectively connecting either of said first decoder and said second decoder connected thereto to said parallel pipeline processor connected thereto;
    whereby the micro instruction received from said first decoder is transferred over said internal bus to said storage circuitry sequentially on an instruction basis to be stored therein.

2. A device in accordance with claim 1, wherein said storage circuitry comprises a general register for storing therein either one of data to be processed and the processing instruction, the parallel instruction including a plurality of fields, each said field containing an operand designating one of said plurality of parallel pipeline processors.

3. A device in accordance with claim 1, wherein said input circuit comprises:
    instruction storage means connected to said first decoder means and said internal bus for storing the processing instructions therein; and
    data storage means connected to said internal bus for storing the data to be processed.

4. A device in accordance with claim 1, wherein said internal bus comprises a plurality of bit lines corresponding in number to the number of bits of the data to be processed or the processing instructions.

5. A parallel processing device for performing processing operations in response to processing instructions defined by a parallel execute instruction to be executed in parallel, comprising:
    an input circuit to receive the processing instructions and data to be processed;
    an instruction decoder connected to said input circuit to decode the processing instructions and to provide a micro instruction for controlling processing corresponding to decoded processing instructions;
    first register circuitry for storing therein data to be processed;
    an internal bus connected to said input circuit and said first register circuitry for transferring bits of the data in parallel from said input circuit to said first register circuitry;
    second register circuitry connected to said instruction decoder for storing the micro instruction for controlling processing corresponding to the decoded processing instructions;
    third register circuitry connected to said instruction decoder and said second register circuitry for storing either of a processing instruction not defined by the parallel execute instruction and a decode instruction to define a selected portion of said second register circuitry;
    a multiplexer connected to said third register circuitry and said selected portion of said second register circuitry for selecting an output from either of said third register circuitry and said second register circuitry; and
    a plurality of parallel pipeline processors connected to said first register circuitry, one of said parallel pipeline processors being connected to an output of said multiplexer, and the rest of said parallel pipeline processors being connected to said second register circuitry, except said selected portion of said second register circuitry, said parallel pipeline processors being connected to said internal bus, said parallel processors being effective to execute parallel processing operations in response to the micro instruction provided from said second register circuitry, one of said parallel pipeline processors being effective to execute parallel processing operations in response to an output of said multiplexer;

said instruction decoder decoding the processing instruction, which is not defined by the parallel execute instruction, to store the micro instruction for controlling processing produced in said third register circuitry while said multiplexer selects the output from said third register circuitry;

said instruction decoder being operative in response to the decode instruction to store the decode instruction in said third register circuitry, and decoding the processing instructions which are defined by the parallel execute instruction, to store the micro instructions for controlling processing produced in said second register circuitry, while said multiplexer selects the output from said selected portion of said second register circuitry.

6. A device in accordance with claim 5, wherein said first register circuitry includes a multi-port register having storage positions in each of which data is stored.

7. A device in accordance with claim 6, wherein said internal bus comprises bit lines corresponding in number to the number of bits of the data.

8. A device in accordance with claim 5, wherein said second register circuitry is aligned logically and unidimensionally, the decode instruction including a field containing a destination operand designating a selected portion of said second register circuitry.

9. A device in accordance with claim 5, wherein said second register circuitry is aligned logically and bidimensionally, a decode instruction including a first field which contains a destination operand designating a column, and a second field which contains another destination operand designating a line of said second register circuitry.

10. The device of claim 1 wherein
said second decoders include first through n-th decoders;
said parallel pipeline processors include first through n-th processing pipelines;
each of said parallel first through n-th decoders is connected to a corresponding one of said first through n-th processors.

* * * * *